United States Patent Office 3,134,768
Patented May 26, 1964

3,134,768
TROPOLONE DERIVATIVES
James Richard Bartels-Keith, Welwyn Garden City, England, assignor to Smith Kline & French Laboratories, Philadelphia, Pa., a corporation of Pennsylvania
No Drawing. Filed Nov. 6, 1962, Ser. No. 235,877
Claims priority, application Great Britain Nov. 10, 1961
13 Claims. (Cl. 260—239.3)

This invention is concerned with tropolone derivatives and methods of preparing various aminoalkyltropolone compounds. More specifically the end products prepared using this invention are illustrated by the following formula:

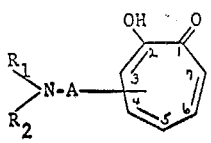

Formula I in which $R_1$ and $R_2$ are hydrogen, lower alkyl of less than 6 carbon atoms or, when taken together with the nitrogen atom, pyrrolidinyl, piperidinyl, morpholinyl, thiomorpholinyl or N-lower alkyl-piperazinyl; A is lower alkylene of 2 to 6 carbon atoms with at least 2 carbon atoms between the N-atom and the tropolone nucleus; the amino alkyl substituent being preferably in the 4 or 5 position.

The tropolone nucleus can be optionally substituted by one or more inert groups known to the art such as halo, lower alkyl, hydroxy, nitro, carboxy or carbalkoxy.

The aminoalkyltropolones are useful as organic intermediates, as inhibitors of the formation of norepinephrine from dopamine, as inhibitors of the enzyme, o methyl transferase or as sequestering agents for metals.

The non-toxic acid addition salts are also covered by this invention such as the hydrochloride, phosphate, sulfate, maleate, etc. The metal complexes formed by these compounds are also of use such as those formed with copper, iron, cobalt or magnesium as well as the alkali metal salts such as with potassium or sodium.

An excellent and novel method for preparing the 4- and 5-aminoalkyltropolones is the reaction of the anhydride of a carboxy-carboxymethyl-2-hydroxycycloheptatrien-1-one (carboxy-carboxymethyltropolone) with an aldehyde such as formaldehyde or acetaldehyde together with an amine under Mannich conditions, for instance in a polar, non-aqueous solvent such as N,N-dimethylformamide or N,N-di-methylacetamide at low temperatures such as from about 0–15° C. When a primary amine or ammonia is used a novel intermediate lactam is formed having the following formula:

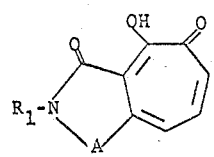

Formula II in which $R_1$ is hydrogen or lower alkyl and A is as defined. Alternatively the lactam ring is fused at the 4,5-position. Other nuclear substituents are as noted hereabove.

The lactams of Formula II are then heated with concentrated acid such as hydrochloric acid or hydrobromic acid under pressure, for instance heated at 125–200° C. in a sealed tube, to effect hydrolysis and decarboxylation to the respective aminoalkyltropolone derivatives of Formula I.

If the Mannich amine reactant is secondary such as a cyclic amine, the lactam is not formed but the nuclear carboxylated tropolone is obtained. Heating with mineral acid gives the decarboxylated tertiary aminoalkyltropolone of Formula I.

The following examples will illustrate this invention. Variations of these reactions and structures will be apparent to one skilled in the art. The word "tropolone" where used herein is used to denote the 2-hydroxy cyclohepta-2,4,6-trien-1-one nucleus. It will be recognized that many of the structures discussed herein are capable of existing in tautomeric or isomeric forms. Also other congeners substituted with inert groups (well known) will be obvious to those skilled in the art. All such compounds are included in this invention.

Example 1

A solution of 4 g. of the known anhydride of 3-carboxy-4-carboxymethyltropolone in 120 ml. of redistilled N,N-dimethylformamide is cooled to between 0 and —5° C. To this solution, 2.25 ml. of concentrated ammonia, 4 g. of the tropolone anhydride in cooled dimethylformamide and 3.05 ml. of 40% aqueous formaldehyde are added with cooling and stirring. The mixture is kept at 3–4° C. for 7 days. The separated solid is collected and washed with dimethylformamide and ether.

The mother filtrate and washings are diluted with 3 parts of ether. The resulting precipitate is separated and washed. The filtrate and washings from this last operation are evaporated to dryness on the steam bath under vacuo. The residue is suspended in acetone-ether to give the yellow-brown lactam of 4-(2-aminoethyl)-3-carboxy tropolone, M.P. 240–245° C. (dec.) Recrystallization from acetonitrile and sublimation gives a purified yellow lactam, M.P. 249–250° C.

The crude lactam (0.5 g.) is heated with 10 ml. of concentrated hydrochloric acid in a sealed tube for 4 hours at 180° C. The resulting dark solution diluted with 20 ml. of water is decolorized with charcoal and evaporated in vacuo under 60° C. The residue is triturated with ethanol-acetone to give 4-(2-aminoethyl)-tropolone dihydrochloride, M.P. 211-213° C. Purification results in a product melting at 221° C.

Substituting an aliquot of methylamine solution for ammonia in the above reaction the N-methyl lactam and N-methylaminoethyltropolone compounds are prepared. Substitution of acetaldehyde for formaldehyde gives the β-methyl congeners.

Example 2

Known 2-methoxy, 3-carbomethoxy-4-carbomethoxymethyltropolone is converted to the 2-ethylether analogue in known manner using ethylmercaptan; then this compound is treated with partially deactivated Raney nickel, oxidized with hydrogen peroxide and hydrolyzed to give 4-carboxy-5-carboxymethyltropolone which is treated at 60° C. with concentrated sulfuric acid and poured into deionized ice-water to give the desired anhydride starting material.

A mixture of 2 g. of the anhydride is reacted with n-butylamine and formaldehyde in dimethylacetamide in the cold as described in Example 1. Working up the reaction mixture as described gives the lactam of 5-(2-butylaminoethyl)-4-carboxytropolone. This compound (75 mg.) is hydrolyzed with concentrated hydrochloric acid in a sealed tube at 175° C. to give the desired 5-(2-butylaminoethyl)-tropolone dihydrochloride.

An aqueous solution of the salt is treated with alkali and extracted with benzene to give the base. Aliquots of the base are treated with sodium to give the sodium salt and with ferric chloride solution to give the ferric complex.

*Example 3*

A mixture of 0.604 g. of the anhydride of 3-carboxy-4-carboxymethyl-tropolone, 60 ml. of 25% dimethylamine in dimethylformamide, 0.23 ml. of aqueous formaldehyde and 8 ml. of dimethylformamide is reacted as in Example 1 at 3–4° C. for 7 days.

The mixture is diluted with 3–4 parts of ether. The filtrate is evaporated to dryness. The residue is triturated with acetone to give 4-(2-dimethylaminoethyl)-3-carboxy-tropolone as a deliquescent brown solid. This material is heated with concentrated hydrochloric acid to give the desired 4-(2-dimethylaminoethyl)-tropolone hydrochloride as a yellow amorphous solid.

*Example 4*

A mixture of 1.2 g. of the anhydride of 3-carboxy-4-carboxymethyl-tropolone, 20 ml. of piperidine, 0.46 ml. of aqueous formaldehyde and 25 ml. of dimethylacetamide is reacted and worked up as in Example 3 to give, after decarboxylation by heating in a sealed tube in sulfuric acid, 4-(2-N-piperidinylethyl)-tropolone upon neutralization.

Substituting N-methylpiperazine and the anhydride of 6-carboxy-5-carboxymethyl-tropolone gives 5-(2-N-methyl-N-piperazinylethyl)-tropolone and its salts.

Substituting morhpoline in Example 3 gives 4-(2-N-morpholinylethyl)-tropolone and its salts.

Substituting pyrrolidinyl gives 4-(2-N-pyrrolidinylethyl)-tropolone and its salts.

Substituting an excess of dimethylamine and an equimolar quantity of acetaldehyde in Example 3 gives 4-(2-diethylaminopropyl)-tropolone and its salts.

What is claimed is:

1. A chemical compound having the formula selected from the group consisting of:

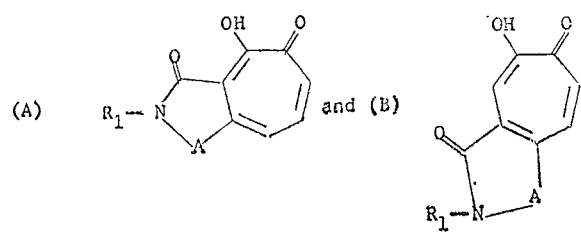

in which $R_1$ is a member selected from the group consisting of hydrogen and lower alkyl; and A is lower alkylene of 2 to 6 carbon atoms.

2. The lactam of 4-(2-aminoethyl)-3-carboxy-tropolone.
3. The lactam of 5-(2-loweralkylaminoethyl)-4-carboxy-tropolone.
4. The lactam of 4-(2-loweralkylaminoethyl)-3-carboxy-tropolone.
5. The lactam of 4-(2-methylaminoethyl)-3-carboxy-tropolone.

6. The process of preparing lactams having the formula selected from the group consisting of:

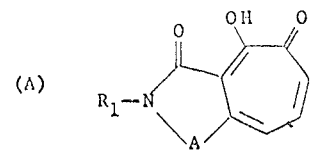 and 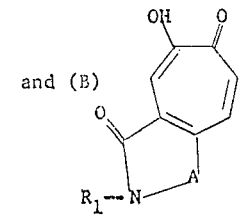

in which $R_1$ is a member selected from the group consisting of hydrogen and lower alkyl; and A is a lower alkylene of 2 to 6 carbon atoms, comprising reacting a carboxy-carboxymethyl-tropolone with a member selected from the group consisting of ammonia and lower alkylamine and an aldehyde selected from the group consisting of formaldehyde and acetaldehyde.

7. The process of claim 6 characterized in that A is ethylene and the aldehyde is formaldehyde.

8. The process of preparing aminoloweralkyl-tropolones comprising heating the lactam of a carboxyaminoloweralkyl-tropolone with a concentrated mineral acid at from about 125–200° C. under pressure.

9. The process of claim 8 in which the lactam of 4-(2-aminoethyl)-3-carboxy-tropolone is heated.

10. The process of claim 8 in which the lactam of 4-(2-methylaminoethyl)-3-carboxy-tropolone is heated.

11. The process of preparing tertiary aminoloweralkyl-tropolones comprising reacting a carboxy-carboxymethyl-tropolone anhydride with a secondary organic amine and a member selected from the group consisting of formaldehyde and acetaldehyde to form a tertiary aminoloweralkyl-α-carboxy-tropolone and heating said tertiary aminoloweralkyl-α-carboxytropolone in an excess of mineral acid until decarboxylation is complete.

12. Tertiaryaminoloweralkyl-α-carboxytropolone said tertiary amino group having the formula

in which $R_1$ and $R_2$ are members selected from the group consisting of hydrogen, lower alkyl and, when taken together with the nitrogen atom, pyrrolidinyl, piperidinyl, morpholinyl, thiomorpholinyl and N-lower alkyl-piperazinyl, said lower alkyl groups having less than 6 carbon atoms.

13. 4-(Dimethylaminoethyl)-3-carboxy-tropolone.

References Cited in the file of this patent

FOREIGN PATENTS 6031 ('53) Japan _____ Nov. 21, 1953
771,484 Great Britain _____ Apr. 3, 1957

OTHER REFERENCES

Chemical Abstracts, vol. 46, pp. 7561–2 (1952), abstracting Nozoe et al., Proc. Japan Acad., vol. 27, pp. 561–4 (1951).

Chemical Abstracts, vol. 48, pp. 3946–8 (1954), abstracting Nozoe et al., "Science Rept. Tohoku Univ., vol. 36, pp, 40–62 (1952).

Chemical Abstracts, vol. 48, pp. 4496–7 (1954), abstracting Nozoe et al., Proc. Japan Acad., vol. 29, pp. 17–21 (1953) (in English).

Cook et al.: J. Chem. Soc., 1954, pp. 530–5.